United States Patent Office

3,130,082
Patented Apr. 21, 1964

3,130,082
SUGAR RECOVERY PROCESS AND PRODUCTS
Gonzalo Serbia, Aguirre, Puerto Rico, assignor to Central Aguirre Sugar Company, Aguirre, Puerto Rico
No Drawing. Filed Nov. 9, 1959, Ser. No. 851,527
10 Claims. (Cl. 127—46)

This invention relates to processes of recovering sugar (sucrose) from the juice extracted from sugar cane as well as from syrups and molasses obtained in cane sugar processes of the prior art and to novel sugar, syrups, and molasses products obtained therein, as well as novel animal feeds and fertilizers produced with the products referred to above.

For a number of years the sugar industry of Puerto Rico has been characterized by a decline in yield of sugar per acre of sugar cane. For nearly half a century the same methods and procedures have been used although there has been some improvement because of refinement in equipment. Some of these developments, however, have had harshly offsetting effects—the introduction into the sugar cane juice of greater percentages of non-sugar materials. The increased percentage of non-sugar materials has in turn complicated the problem of crystallizing the sugar content in the cane juices.

Improved clarification did not remove the salts in solution in the juice, and treatment with ion exchange techniques was tried in order to reduce the concentration of such salts contained in the sugar cane juice, syrups and massecuites. Several procedures were developed but were uneconomical in their application. The first steps taken in this direction were the use of traditional ion exchange resin beds in which the sugar solutions were passed over alternate beds of cation and anion exchangers to reduce the salt content. This increased the yield, but was uneconomical because the cost of the chemicals used for the regeneration of the resins was too high in relation to the increased sugar yield. Furthermore, one of the most critical problems in using ion exchange resins has been that of inversion caused by cation beds.

A second attempt was made with procedures known as ion exclusion. In the case of ion exclusion returns are just about enough to compensate for the added expense in chemicals and capital expenditures and, therefore, did not offer economic results which justified its use.

A third step which was attempted was that commonly known as ion retardation which means the treatment of sugar solutions over resin beds of a special type which remove both the cations and the anions without need of chemical regeneration of the special resin. This process, however, did not produce economical results.

Objects of the present invention include improved methods of sugar (sucrose) recovery from sugar cane containing materials which include juices obtained from the cane, as well as syrups and molasses, and other objects of the invention include the production of novel sugar products as well as novel syrups and molasses resulting from such processes.

Further objects include the production of fertilizers, animal feed, and other commercial products containing the newly derived sugar products.

Still further objects and advantages will appear from the more detailed description set forth below, it being understood that this more detailed description is given by way of illustration and not as limiting, since various changes therein may be made by those skilled in the art within the scope and spirit of the present invention.

In accordance with the present invention, the cations present in the sugar material which may be juices, syrups or molasses are subjected to treatment with cation exchange resins on the ammonium form to replace the metal cations present in the sugar material undergoing treatment, the replaced cations being of such character that the sugar material containing ammonium replaced cations may be separated from the metal cations and sugar recovered by conventional processes.

The standard operation in sugar recovery generally follows a scheme something like the following: The clarified juice extracted from crushed cane to which water has been added contains about 15% solids made up approximately of 82% sucrose, 5% reducing sugars, and 13% non-sugar material. The proportions of these 3 ingredients will vary depending on the degree of ripeness of the cane, soil types and many biological factors.

The clarified juice is subjected to evaporation to give a syrup containing approximately 60% solids and then passes to vacuum pans where the initial crystallization is carried out to produce a first or "A" massecuite which passes to centrifugals to give an A sugar and an A molasses, the A sugar being a commercial sugar. The A molasses passes to a second group of vacuum pans, then to centrifugals to separate a B sugar which is still commercial sugar and a B molasses, and this operation is repeated to produce a C sugar and a C or final molasses. Final molasses is referred to herein as the material from which no further amount of sucrose may be economically recovered by crystallization. Since it is uneconomical to attempt to recover crystallized sugar from the C sugar for commercial sugar use, this sugar is used as seed crystal and fed back to the A or B stage.

In the process of the invention a conversion step is employed in which cations, present in the juice or in a syrup or molasses, are processed with ion exchange resin to convert the cations which are present in the juice, syrup or molasses depending on the stage of the treatment, into corresponding ammonium salts. This treatment may be carried out by the utilization of ion exchange resins readily available on the market for this purpose. Such resins include the several types such as sulphonated copolymer of styrene and divinyl benzene, sulphonated phenol formaldehyde type resins known as phenolics, acrylic copolymers which have an active carboxylic group. Exemplary resins of the first type are "Dowex 50" and "Dowex 50 W" manufactured by Dow Chemical Company, the "Amberlite" resins IR–120, marketed by Rohm & Haas, "Chempro 20" by Chemical Process Company, "HCR" by Nalco, "Ilco 211" by Illinois Water Treatment Company, and "Permutit Q," marketed by Permutit Company; and an exemplary acrylic copolymer being "Amberlite IRC–50," marketed by Rohm & Haas.

The average cation content of the juice at the stage referred to above may be given as the following:

| | Parts per million |
|---|---|
| K | 2400 |
| Ca and Mg | 1800 |
| Na | 50 |

In the conversion step the juice is placed in contact with an ion exchange resin as in conventional utilization of such ion exchange resin, the ion exchange resin in this case being in ammonium form. The ion exchange treatment may be carried out at temperatures from normal ambient temperatures to 180° F., and the procedures in the treatment itself follow conventional practice. It may be noted that the ion exchange treatment results in replacement of substantial amounts of cations present in the original juice or syrup or molasses with ammonium ion and that the sucrose takes no part in the ion exchange. The following comparison will give an indication of the extent of conversion.

Original juice, 15% solution:

| | Parts per million |
|---|---|
| Na | 50–100 |
| K | 2000–4000 |
| Ca, Mg | 1500–2500 |

The above percentages in the juice represent usual variations that may be run into with an average as previously given. The values given above are expressed in terms of sodium chloride equivalents.

Upon passage through the converter, the potassium is most completely removed to the extent of 95–100%, the Ca and Mg ions to 80–100%, while the sodium removal is around about 50%. The extent of removal can be controlled but the above represents values that are satisfactory.

After conversion the juice still contains about 150 parts per million of the cations referred to above and about 4100 parts per million of ammonium ions expressed as sodium chloride equivalents, and an average converted juice may be tabulated as containing the following:

| | P.p.m. |
|---|---|
| Na | 25–50 |
| K | 10–50 |
| Ca, Mg | 100–200 |

In the converted juice the ammonium ions present may in general be about 95% of the total cations present, but this may, of course, vary within substantial limits.

The conversion step or treatment may be utilized at any stage of the otherwise normal sugar production process. In discussing the matter generally above, the discussion started with the clarified juice and gave the cation content of such juice which was subjected to the normal evaporation and other treatments to produce commercial sugar.

The conversion process of the present invention may be applied to the clarified juice or it may be applied at any stage in the normal sugar production process to any of the products which are being subjected to recovery of commercial sugar, such as the syrup, "A" or "B" molasses, and may be applied to molasses which is no longer utilizable commercially for recovery of crystallized sugar.

When the conversion process is applied to the treatment of clarified juice, substantial improvement in the process is obtained by prevention of scale formation in the heaters, evaporators, and other similar equipment.

In the alternative process where an "A" molasses, for example, is subjected to the conversion treatment, the sugar production processes then follow on again in the normal way following such treatment. The same is true if syrup, or a "B" or "C" molasses is subjected to the conversion process.

It is of great importance to note the increase in sugar recovery which is obtained by the present process. Recovery is increased, first, by the fact that sodium, potassium, calcium, magnesium salts are exchanged by ammonium salts, which increases the purity of the material; and also because of the fact that the solubility of sucrose in the presence of ammonium salts is less than in the presence of an equivalent amount of potassium; this results in less sugar remaining in the waste molasses. The ammonium salts enhance the rate of crystallization and decrease the solubility of sucrose. The fact that a crystal of sugar of given size will grow more rapidly in a solution containing ammonium salts than it will in a solution of the same sugar concentration containing an equivalent amount of potassium, magnesium or calcium salts is a very significant factor.

In regenerating the resin, use is made of conventional processing in which an ammonium salt solution yields a product of high potassium content of value for fertilizer and other uses. The final molasses recovered after the ammonium conversion is enriched or fortified and has high ammonium content and is indicated as of value for animal feed except that it is limited to ruminants. The high concentration of ammonium salts in this molasses also enhances its value as raw material for the fermentation industries, as it will not be necessary to add the ammonium salts which normally are added as a nutrient for the fermentation organisms.

In ordinary blackstrap molasses conventionally produced, the potassium salts contained therein produce a laxative effect on the cattle. However, the ammonium conversion method eliminates this situation by removal of the potassium salts, making it possible to feed cattle larger daily intakes of blackstrap molasses.

The following examples will illustrate the invention, parts being by weight unless otherwise indicated.

Example I

Sugar cane juice containing about 16% solids as pressed from the cane and clarified in the usual way was used. This juice contained, as sodium chloride equivalents:

| | Parts per million |
|---|---|
| Na | 125 |
| K | 2795 |
| Ca, Mg | 1800 |

This juice was processed by passing it through a cation exchange resin bed namely, Amberlite IR–120 on the ammonium form at the rate of about 150 gals./hr./sq. ft., the temperature of the juice being about 170° F., the resin bed being 6 feet deep. The metal cation content of the treated juice was, expressed as NaCl equivalents:

| | Parts per million |
|---|---|
| Na | 45 |
| K | 90 |
| Ca, Mg | 40 |
| $NH_4$ | 4550 |

The converted juice thus obtained was subjected to recovery of sugar by conventional plant processing to produce sugar and final molasses.

Example II

Sugar cane syrup containing about 58% solids, as obtained from the evaporation of juice expressed from the cane and clarified in the usual way was used. The syrup contained the following cations, expressed as NaCl equivalents:

| | Percent by weight |
|---|---|
| Na | 0.15 |
| K | 1.01 |
| Ca, Mg | 0.66 |

This syrup was processed by passing it through a cation exchange resin namely Amberlite IR–120 on the ammonium form at the rate of about 120 gals./hr./sq. ft., the temperature of the syrup being about 160° F., the resin bed being 6 feet deep. The cation content of the treated syrup was:

| | Percent by weight |
|---|---|
| Na | 0.01 |
| K | 0.06 |
| Ca, Mg | 0.12 |
| $NH_4$ | 1.53 |

The converted syrup thus obtained was subjected to recovery of sugar by conventional plant processing to produce sugar and final molasses.

Example III

Cane "B" molasses containing about 52% solids and 56% purity, as obtained in the customary processing of cane sugar was used. The molasses contained the following cations, expressed as NaCl equivalents:

| | Percent by weight |
|---|---|
| Na | 0.74 |
| K | 2.37 |
| Ca, Mg | 1.29 |

This molasses was processed by passing it through a cation exchange resin bed namely Amberlite IR–120 on the ammonium form at the rate of about 90 gals./hr./sq. ft., the temperature of the molasses being 160° F., the resin bed being 6 feet deep. The cation content of the treated molasses was:

| | Percent by weight |
|---|---|
| Na | 0.22 |
| K | 0.08 |
| Ca, Mg | 0.48 |
| $NH_4$ | 3.65 |

The converted molasses thus obtained was subjected to recovery of sugar by conventional plant processing to produce sugar and final molasses.

*Example IV*

Blackstrap cane molasses, of the type usually obtained as a by-product of the production of sugar, was diluted to 47% solids and used for this example. The molasses contained the following cations, expressed as NaCl equivalents:

| | Percent by weight |
|---|---|
| Na | 1.00 |
| K | 3.22 |
| Ca, Mg | 1.78 |

This molasses was processed by passing it through a cation exchange resin bed namely Amberlite IR–120 on the ammonium form at the rate of 60 gals./hr./sq. ft., the temperature of the molasses being 100° F., the resin bed being 6 feet deep. The cation content of the treated molasses was:

| | Percent by weight |
|---|---|
| Na | 0.30 |
| K | 0.25 |
| Ca, Mg | 0.40 |
| $NH_4$ | 5.00 |

The total nitrogen content of the converted molasses was 1.18% at a solids content of 34% which is equal to a protein equivalent of 21.7% on the basis of total solids.

The presence of the ammonium ions in the converted materials shown in Examples I, II and III made a great improvement in the recovery of sugar therefrom by the usual methods of processing. This improvement was mainly due to:

(1) Increase in purity by the conversion,
(2) Increase in the velocity of crystallization of sucrose, and
(3) Decrease in the solubility of sucrose in the presence of ammonium ions.

I claim:
1. The method of treating sugar (sucrose) bearing juices, syrups and molasses containing metallic cations of potassium, sodium, calcium and magnesium which consists essentially in subjecting the sugar material to the action of a cation exchange resin of the ammonium form to exchange metal cations in the sugar material with ammonium ions and to fix the metal cations in the resin, separating the resin carrying the metal cations from the sugar material carrying the ammonium ions exchanged therein for potassium, sodium, calcium and magnesium cations, and recovering sugar from the latter in the presence of the ammonium ions.

2. A method as in claim 1 in which the sugar material is clarified cane juice.

3. A method as in claim 1 in which the sugar material is concentrated clarified juice.

4. A method as in claim 1 in which the material subjected to the action of the ion exchange resin is mother liquor from the crystallization of sucrose sugar containing materials.

5. A method as in claim 1 in which the process is continued to produce a converted material in which the cations are predominantly ammonium ions.

6. An animal feed containing the converted material of claim 5, in which the cations are predominantly ammonium ions, and the potassium and calcium ions are below that giving undesired laxative action.

7. The feed of claim 6 in which the converted material is molasses.

8. A protein substitute for ruminants resulting from claim 5.

9. In the method of producing a fertilizer from components of the converted resin separated in claim 1, the steps of recovering material containing the sugar-derived cations having substantially the entire potassium content removed from the converted resin, and compounding such material containing the said cations with a fertilizer carrier.

10. A fertilizer resulting from claim 9.

References Cited in the file of this patent

UNITED STATES PATENTS

| 2,560,504 | Day et al. | July 10, 1951 |
| 2,890,972 | Wheaton | June 16, 1959 |
| 2,937,959 | Reents | May 24, 1960 |
| 2,988,463 | Vajna | June 13, 1961 |

FOREIGN PATENTS

| 768,278 | Great Britain | Oct. 20, 1954 |

OTHER REFERENCES

Chem. Abs., vol. 51, p. 4600c.
Chem. Abs., vol. 49, p. 14355g.
Balch: "Wax and Fatty Byproducts From Sugarcane," October 1947, p. 52, pamphlet, Sugar Research Foundation, Inc., N.Y.
Chem. Abs., vol. 52, p. 15939c.